(12) United States Patent
Davidson

(10) Patent No.: US 10,277,536 B1
(45) Date of Patent: Apr. 30, 2019

(54) CONCEPTS FOR PROVIDING NOTIFICATIONS FOR EVENTS OF INTEREST

(71) Applicant: UNITED PARCEL SERVICE OF AMERICA, INC., Atlanta, GA (US)

(72) Inventor: Mark J. Davidson, Alpharetta, GA (US)

(73) Assignee: UNITED PARCEL SERVICE OF AMERICA, INC., Atlanta, GA (US)

(*) Notice: Subject to any disclaimer, the term of this patent is extended or adjusted under 35 U.S.C. 154(b) by 137 days.

(21) Appl. No.: 14/334,996

(22) Filed: Jul. 18, 2014

Related U.S. Application Data

(60) Provisional application No. 61/970,170, filed on Mar. 25, 2014.

(51) Int. Cl.
| | | |
|---|---|---|
| *G06F 15/16* | (2006.01) |
| *H04L 12/58* | (2006.01) |
| *H04L 12/26* | (2006.01) |
| *H04L 29/08* | (2006.01) |
| *H04W 4/02* | (2018.01) |
| *H04N 21/258* | (2011.01) |
| *H04W 64/00* | (2009.01) |

(52) U.S. Cl.
CPC .......... *H04L 51/04* (2013.01); *H04L 43/08* (2013.01); *H04L 51/20* (2013.01); *H04L 67/18* (2013.01); *H04M 2242/30* (2013.01); *H04N 21/25841* (2013.01); *H04W 4/02* (2013.01); *H04W 4/025* (2013.01); *H04W 64/00* (2013.01); *H04W 64/003* (2013.01)

(58) Field of Classification Search
CPC ....... H04L 43/08; H04L 67/18; H04L 12/581; H04L 12/5865; H04L 51/04; H04L 51/20; H04W 4/02; H04W 4/025; H04W 64/00; H04W 64/003; H04M 2203/2094; H04M 2242/30; H04M 3/42348; H04N 21/25841
USPC .......... 709/206, 223, 224; 455/456.1, 456.3, 455/457; 340/539.13
See application file for complete search history.

(56) References Cited

U.S. PATENT DOCUMENTS

| | | |
|---|---|---|
| 6,411,891 B1 | 6/2002 | Jones |
| 7,624,024 B2 | 11/2009 | Levis et al. |
| 2003/0020623 A1* | 1/2003 | Cao ........................ G01C 21/20 340/686.6 |
| 2004/0174264 A1 | 9/2004 | Reisman et al. |
| 2004/0243430 A1 | 12/2004 | Horstemeyer |
| 2006/0015503 A1 | 1/2006 | Simons et al. |

(Continued)

OTHER PUBLICATIONS

United States Patent and Trademark Office, Office Action for U.S. Appl. No. 14/335,025, dated Jun. 23, 2016, 14 pages, U.S.A.

(Continued)

*Primary Examiner* — Liang Che A Wang
*Assistant Examiner* — Johnny B Aguiar
(74) *Attorney, Agent, or Firm* — Shook, Hardy & Bacon LLP

(57) ABSTRACT

Computer program products, methods, systems, apparatus, and computing entities are provided. In one embodiment, the location of computing entities can be monitored to determine whether they are within a configurable distance from each other. In another embodiment, direct communications with each other can be monitored. The locations or communications can be used to initiate specific actions/steps.

12 Claims, 12 Drawing Sheets

(56) References Cited

U.S. PATENT DOCUMENTS

| | | | | |
|---|---|---|---|---|
| 2007/0282621 | A1* | 12/2007 | Altman | G06Q 10/10 |
| | | | | 705/319 |
| 2008/0032666 | A1* | 2/2008 | Hughes | H04W 4/02 |
| | | | | 455/404.1 |
| 2008/0214235 | A1 | 9/2008 | Sagou et al. | |
| 2008/0291022 | A1* | 11/2008 | Amador | G06Q 30/02 |
| | | | | 340/572.1 |
| 2009/0030999 | A1* | 1/2009 | Gatzke | G06Q 10/107 |
| | | | | 709/207 |
| 2009/0191849 | A1 | 7/2009 | Fioretti et al. | |
| 2010/0289644 | A1* | 11/2010 | Slavin | G08B 13/2402 |
| | | | | 340/568.1 |
| 2010/0311395 | A1* | 12/2010 | Zheng | H04W 4/029 |
| | | | | 455/414.1 |
| 2011/0294521 | A1 | 12/2011 | Freathy et al. | |
| 2012/0030133 | A1 | 2/2012 | Rademaker | |
| 2013/0030873 | A1 | 1/2013 | Davidson | |
| 2013/0231130 | A1 | 9/2013 | Cherian et al. | |
| 2013/0304349 | A1 | 11/2013 | Davidson | |
| 2013/0331127 | A1* | 12/2013 | Sabatelli | H04W 4/021 |
| | | | | 455/456.3 |
| 2014/0128103 | A1* | 5/2014 | Joao | H04W 4/023 |
| | | | | 455/456.3 |
| 2014/0192667 | A1 | 7/2014 | Kalapatapu et al. | |
| 2014/0192737 | A1 | 7/2014 | Belghoul et al. | |
| 2014/0206400 | A1* | 7/2014 | De Vries | H04L 12/5895 |
| | | | | 455/456.3 |
| 2014/0280865 | A1 | 9/2014 | Albertson et al. | |
| 2015/0081587 | A1 | 3/2015 | Gillen | |
| 2015/0305077 | A1 | 10/2015 | Johnsson et al. | |

OTHER PUBLICATIONS

United States Patent and Trademark Office, Office Action for U.S. Appl. No. 14/335,025, dated Oct. 26, 2016, 18 pages, U.S.A.
United States Patent and Trademark Office, Office Action for U.S. Appl. No. 14/335,472, dated Mar. 21, 2017, 25 pages, U.S.A.
United States Patent and Trademark Office, Office Action for U.S. Appl. No. 14/335,025, dated May 9, 2017, 15 pages, U.S.A.
Notice of Allowance and Fees Due (PTOL-85) dated Sep. 22, 2017 for U.S. Appl. No. 14/335,025.
Non-Final Rejection dated Nov. 7, 2017 for U.S. Appl. No. 14/335,472.
Notice of Allowance and Fees Due (PTOL-85) dated Sep. 12, 2017 for U.S. Appl. No. 14/335,025.
Final Rejection dated Jul. 7, 2017 for U.S. Appl. No. 14/335,472.

* cited by examiner

| Event No. | Event Type | Date | Time | Location | User |
|---|---|---|---|---|---|
| 1 | On Bus | 5/14/2014 | 8:03:17am | 33.991073, -84.239028 | Johnny |
| 2 | Off Bus | 5/14/2014 | 8:21:44am | 33.941701, -84.211819 | Johnny |
| 3 | Enter School | 5/14/2014 | 8:24:59am | 33.941733, -84.211822 | Johnny |
| 4 | Exit School | 5/14/2014 | 3:01:15pm | 33.941733, -84.211822 | Johnny |
| 5 | On Bus | 5/14/2014 | 3:15:37pm | 33.941705, -84.211817 | Johnny |
| 6 | Off Bus | 5/14/2014 | 3:30:42pm | 33.991075, -84.239026 | Johnny |

CONCEPTS FOR PROVIDING NOTIFICATIONS FOR EVENTS OF INTEREST

CROSS-REFERENCE TO RELATED APPLICATIONS

This application claims priority to U.S. Provisional Application No. 61/970,170 filed Mar. 25, 2014, which is hereby incorporated herein in its entirety by reference.

BACKGROUND

With the explosion of mobile devices, new techniques and approaches are needed for determining/identifying events of interest and providing notifications/messages regarding the same.

BRIEF SUMMARY

In general, embodiments of the present invention provide methods, apparatus, systems, computing devices, computing entities, and/or the like for providing notifications for events of interest.

In accordance with one aspect, a method is provided. In one embodiment, the method comprises (1) monitoring the location of a first computing entity, the location of a second computing entity, or both; (2) determining whether the first computing entity and the second computing entity are within a configurable distance from each other; and (3) responsive to determining that the first computing entity and the second computing entity are within the configurable distance from each other, storing an indication of the time and the location at which the first computing entity and the second computing entity were within the configurable distance from each other.

In accordance with another aspect, a computer program product is provided. The computer program product may comprise at least one computer-readable storage medium having computer-readable program code portions stored therein, the computer-readable program code portions comprising executable portions configured to (1) monitor the location of a first computing entity, the location of a second computing entity, or both; (2) determine whether the first computing entity and the second computing entity are within a configurable distance from each other; and (3) responsive to determining that the first computing entity and the second computing entity are within the configurable distance from each other, store an indication of the time and the location at which the first computing entity and the second computing entity were within the configurable distance from each other.

In accordance with yet another aspect, an apparatus comprising at least one processor and at least one memory including computer program code is provided. In one embodiment, the at least one memory and the computer program code may be configured to, with the processor, cause the apparatus to (1) monitor the location of a first computing entity, the location of a second computing entity, or both; (2) determine whether the first computing entity and the second computing entity are within a configurable distance from each other; and (3) responsive to determining that the first computing entity and the second computing entity are within the configurable distance from each other, store an indication of the time and the location at which the first computing entity and the second computing entity were within the configurable distance from each other.

In accordance with one aspect, a method is provided. In one embodiment, the method comprises (1) receiving a notification that a first computing entity and a second computing entity are in direct communication with each other; and (2) responsive to receiving the notification that the first computing entity and the second computing entity are in direct communication with each other, storing an indication of the time and the location at which the first computing entity and the second computing entity were are in direct communication with each other.

In accordance with another aspect, a computer program product is provided. The computer program product may comprise at least one computer-readable storage medium having computer-readable program code portions stored therein, the computer-readable program code portions comprising executable portions configured to (1) receive a notification that a first computing entity and a second computing entity are in direct communication with each other; and (2) responsive to receiving the notification that the first computing entity and the second computing entity are in direct communication with each other, store an indication of the time and the location at which the first computing entity and the second computing entity were are in direct communication with each other.

In accordance with yet another aspect, an apparatus comprising at least one processor and at least one memory including computer program code is provided. In one embodiment, the at least one memory and the computer program code may be configured to, with the processor, cause the apparatus to (1) receive a notification that a first computing entity and a second computing entity are in direct communication with each other; and (2) responsive to receiving the notification that the first computing entity and the second computing entity are in direct communication with each other, store an indication of the time and the location at which the first computing entity and the second computing entity were are in direct communication with each other.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 5-12 are exemplary input and output produced in accordance with various embodiments of the present invention.

DETAILED DESCRIPTION

Figure 1:
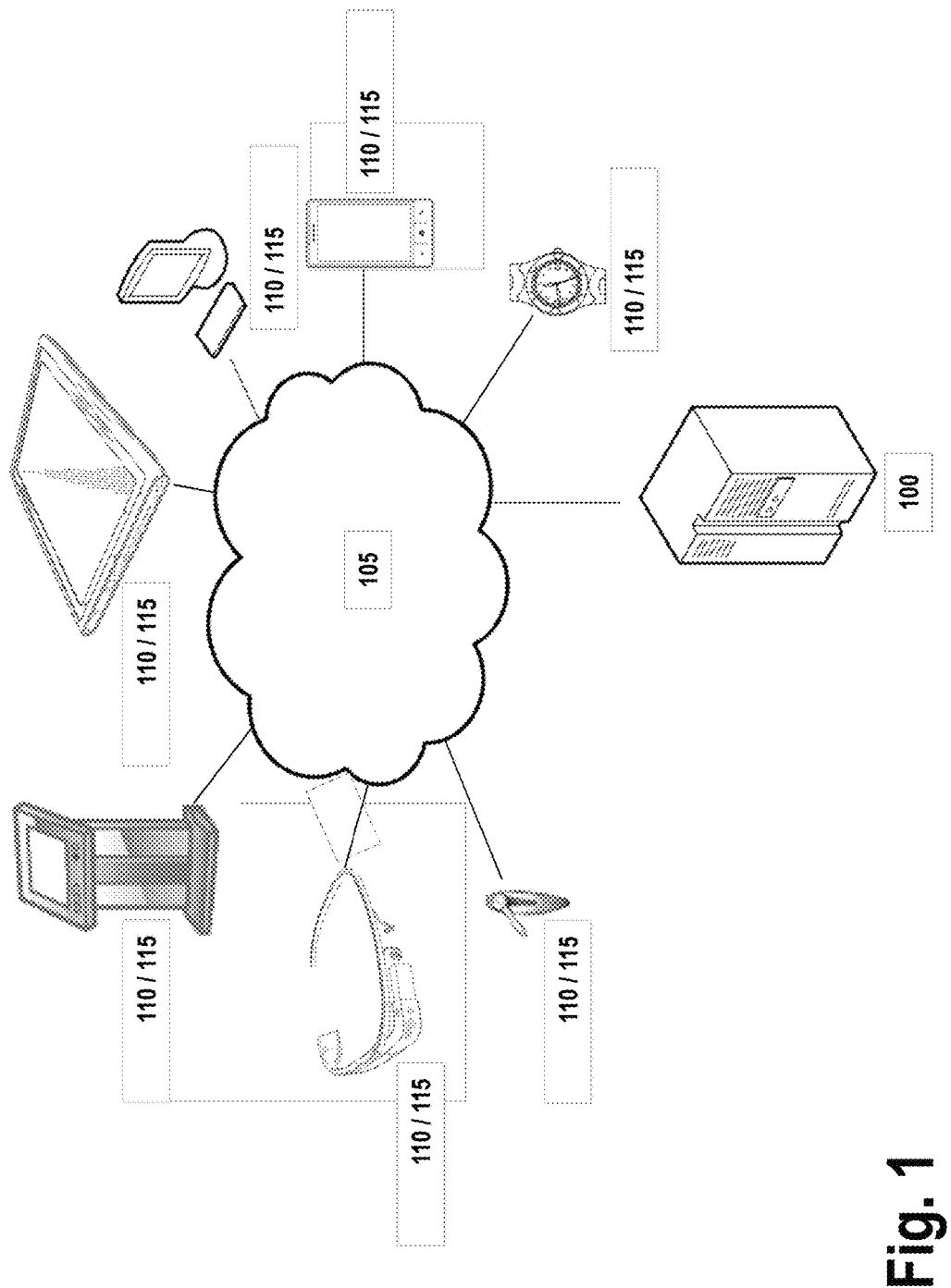
FIG. 1 is an overview of a system that can be used to practice embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an illustration of an exemplary embodiment of the present invention. As shown in FIG. 1, this particular embodiment may include one or more monitoring computing entities 100, one or more networks 105, one or more connection/proximity computing entities 110, and one or more user computing entities 115. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Monitoring Computing Entity

Figure 2:
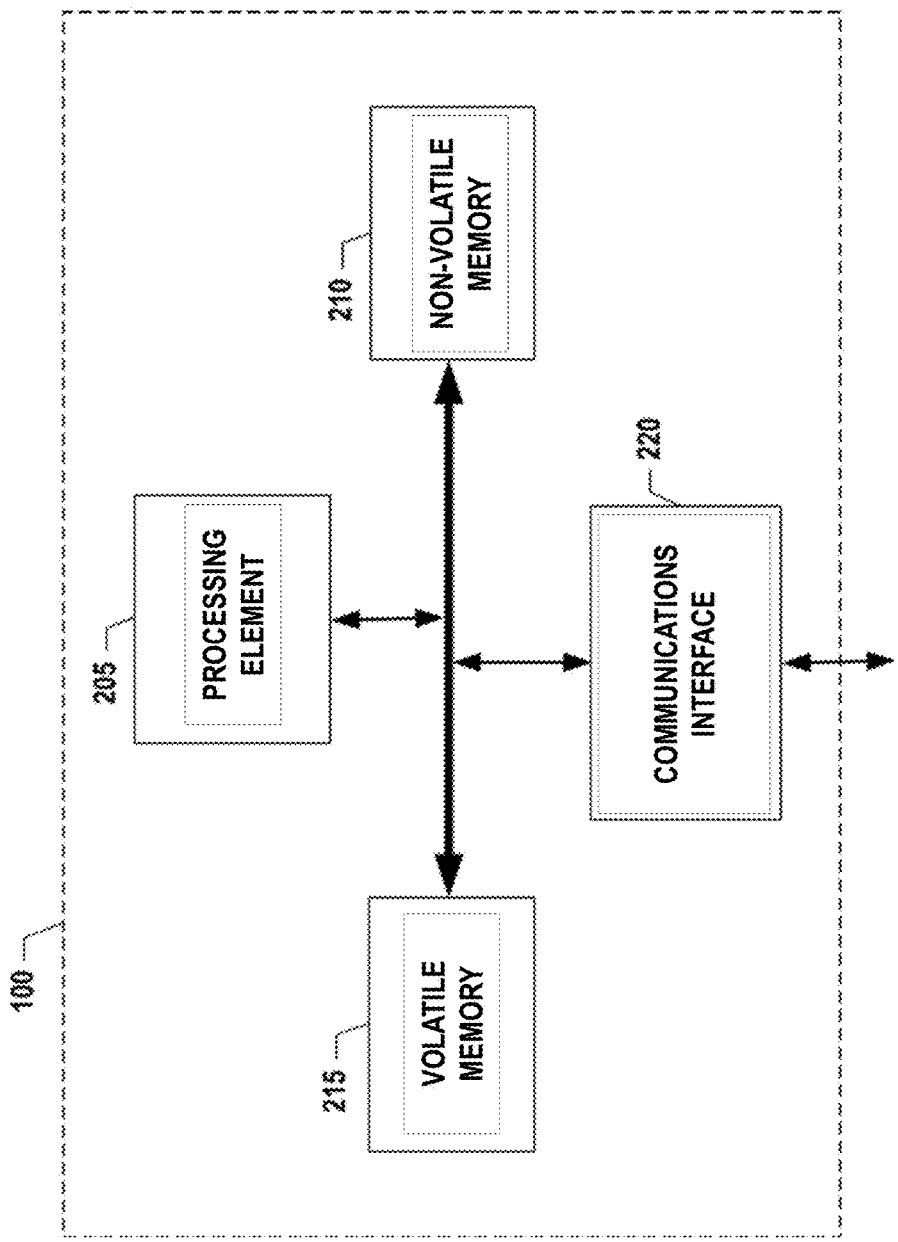
FIG. 2 is an exemplary schematic diagram of a monitoring computing entity according to one embodiment of the present invention.

FIG. 2 provides a schematic of a monitoring computing entity 100 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the monitoring computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the monitoring computing entity 100 may communicate with user computing entities 115, connection/proximity computing entities 110, and/or the like.

As shown in FIG. 2, in one embodiment, the monitoring computing entity 100 may include or be in communication with one or more processing elements 205 (also referred to as processors, processing circuitry, and/or similar terms used herein interchangeably) that communicate with other elements within the monitoring computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the monitoring computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The terms database, database instance, database management system, and/or similar terms used herein interchangeably may refer to a structured collection of records or data that is stored in a computer-readable storage medium, such as via a relational database, hierarchical database, and/or network database.

In one embodiment, the monitoring computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the monitoring computing entity 100 with the assistance of the processing element 205 and operating system.

As indicated, in one embodiment, the monitoring computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the monitoring computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Bluetooth protocols, Wibree, Home Radio Frequency (HomeRF), Simple Wireless Abstract Protocol (SWAP), wireless universal serial bus (USB) protocols, and/or any other wireless protocol.

Although not shown, the monitoring computing entity 100 may include or be in communication with one or more input elements, such as a keyboard input, a mouse input, a touch screen/display input, motion input, movement input, audio input, pointing device input, joystick input, keypad input, and/or the like. The monitoring computing entity 100 may also include or be in communication with one or more output elements (not shown), such as audio output, video output, screen/display output, motion output, movement output, and/or the like.

As will be appreciated, one or more of the monitoring computing entity's 100 components may be located remotely from other monitoring computing entity 100 components, such as in a distributed system. Furthermore, one or more of the components may be combined and additional components performing functions described herein may be included in the monitoring computing entity 100. Thus, the monitoring computing entity 100 can be adapted to accommodate a variety of needs and circumstances. As will be recognized, these architectures and descriptions are provided for exemplary purposes only and are not limiting to the various embodiments.

2. Exemplary Connection/Proximity Computing Entity

Figure 3:
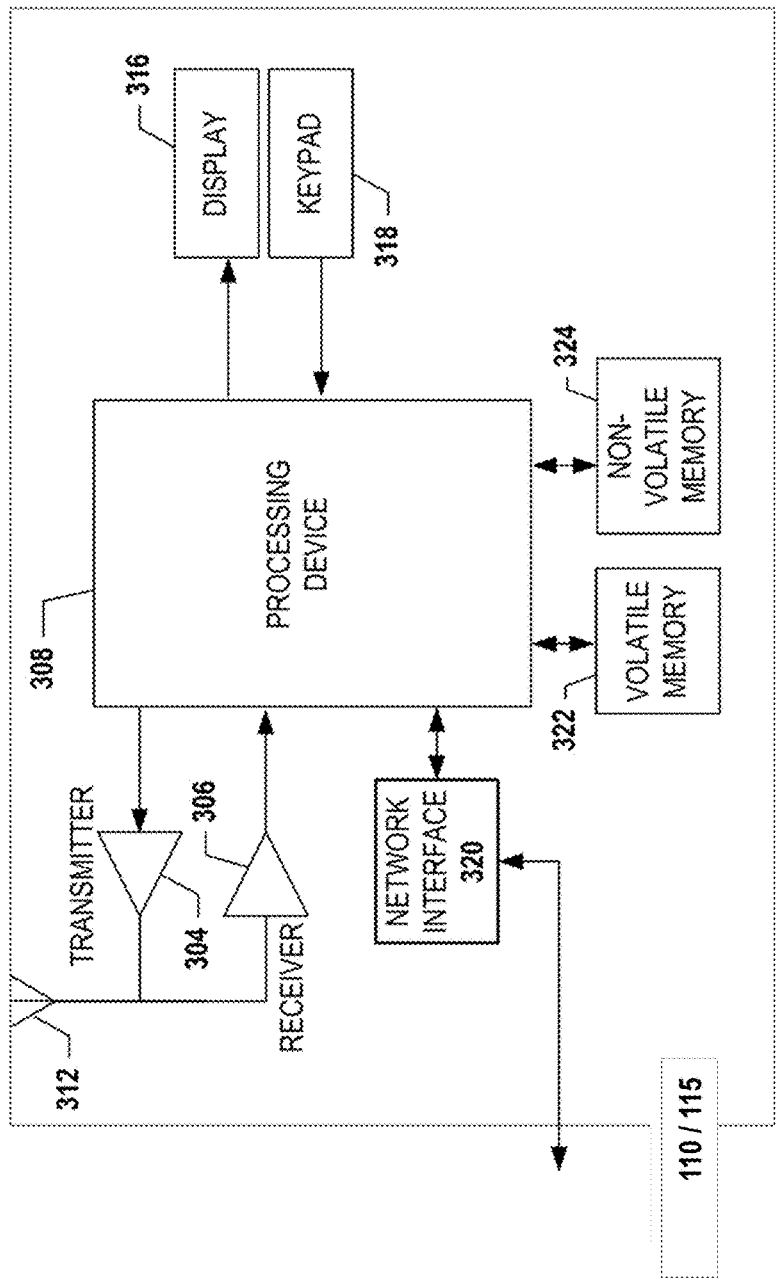
FIG. 3 is an exemplary schematic diagram of a connection/proximity computing entity according to one embodiment of the present invention.

FIG. 3 provides an illustrative schematic representative of a connection/proximity computing entity 110 that can be used in conjunction with embodiments of the present invention. A connection/proximity computing entity 110 may include one or more components that are functionally similar to those of the monitoring computing entity 100. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG. 3, the connection/proximity computing entity 110 may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the connection/proximity computing entity 110 may be capable of operating with one or more air interface standards, communication protocols, modulation types, and access types. More particularly, the connection/proximity computing entity 110 may operate in accordance with any of a number of wireless communication standards and protocols, such as those described above with regard to the monitoring computing entity 100. In a particular embodiment, the connection/proximity computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth, USB, Wibree, HomeRF, SWAP, and/or the like. Similarly, the connection/proximity computing entity 110 may operate in accordance with multiple wired communication standards and protocols, such as those described above with regard to the monitoring computing entity 100 via a network interface 320.

Via these communication standards and protocols, the connection/proximity computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The connection/proximity computing entity 110 can also download changes, add-ons, and updates, for instance, to its firmware, software (e.g., including executable instructions, applications, program modules), and operating system.

According to one embodiment, the connection/proximity computing entity 110 may include a location determining aspects, device, module, functionality, and/or similar words used herein interchangeably. For example, the connection/proximity computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined/identified by triangulating the connection/proximity computing entity's 110 position in connection with a variety of other systems, including cellular towers, Wi-Fi access points, and/or the like. Similarly, the connection/proximity computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine/identify the location of someone or something to within inches or centimeters.

The connection/proximity computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the connection/proximity computing entity 110 to interact with and/or cause display of information from the monitoring computing entity 100, as described herein. The user input interface can comprise any of a number of devices allowing the connection/proximity computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the connection/proximity computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The connection/proximity computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the connection/proximity computing entity 110. As indicated, this may include a user application that is resident on the entity or accessible through a browser or other user interface for communicating with the monitoring computing entity 100, user computing entity 115, and/or various other computing entities.

In another embodiment, the connection/proximity computing entity 110 may include one or more components or functionality that are the same or similar to those of the monitoring computing entity 100, as described in greater detail above. As will be recognized, these architectures and descriptions are provided for exemplary purposes only and are not limiting to the various embodiments.

In one embodiment, connection/proximity computing entities 110 may be fixed with regard to their geographic locations, such as by being in fixed positions at school entrances, bus stops, mall entrances, aisles of a store, in classrooms, on playgrounds, at intersections, on light poles, in cafeterias or hallways, on bridges, and/or the like. In another embodiment, connection/proximity computing entities 110 may be mobile with regard to their geographic locations. For example, one or more of the connection/proximity computing entities 110 may be disposed on school buses, worn by school bus drivers, be attached to package delivery vehicles, attached to mobile shipping containers, affixed to shopping carts or wheelchairs, positioned in passenger vehicles, and/or the like. As will be recognized, user computing entities 115 may also be mobile with regard to their geographic locations by being carried or worn by the respective users, attached to vehicles, and/or the like. As will be recognized, a variety of other approaches and techniques can be used to adapt to various needs and circumstances.

3. Exemplary User Computing Entity

A user may be an individual, a family, a family member, a company, an organization, an entity, a department within an organization, a representative of an organization and/or person, and/or the like. In one embodiment, a user computing entity 115 may include one or more components that are functionally similar to those of the monitoring computing entity 100 and/or the connection/proximity entity 110. For example, in one embodiment, each user computing entity 115 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, the user interface may be a user application, browser, user interface, and/or similar words used herein interchangeably executing on and/or accessible via the user computing entity 115 to interact with and/or cause display of information from the monitoring computing entity 100, as described herein. This may also enable the user computing entity 115 to communicate with various other computing entities, such as monitoring computing entities 100, connection/proximity entities 110, and/or various other computing entities. As will be recognized, these architectures and descriptions are provided for exemplary purposes only and are not limiting to the various embodiments.

III. EXEMPLARY SYSTEM OPERATION

Figure 4:
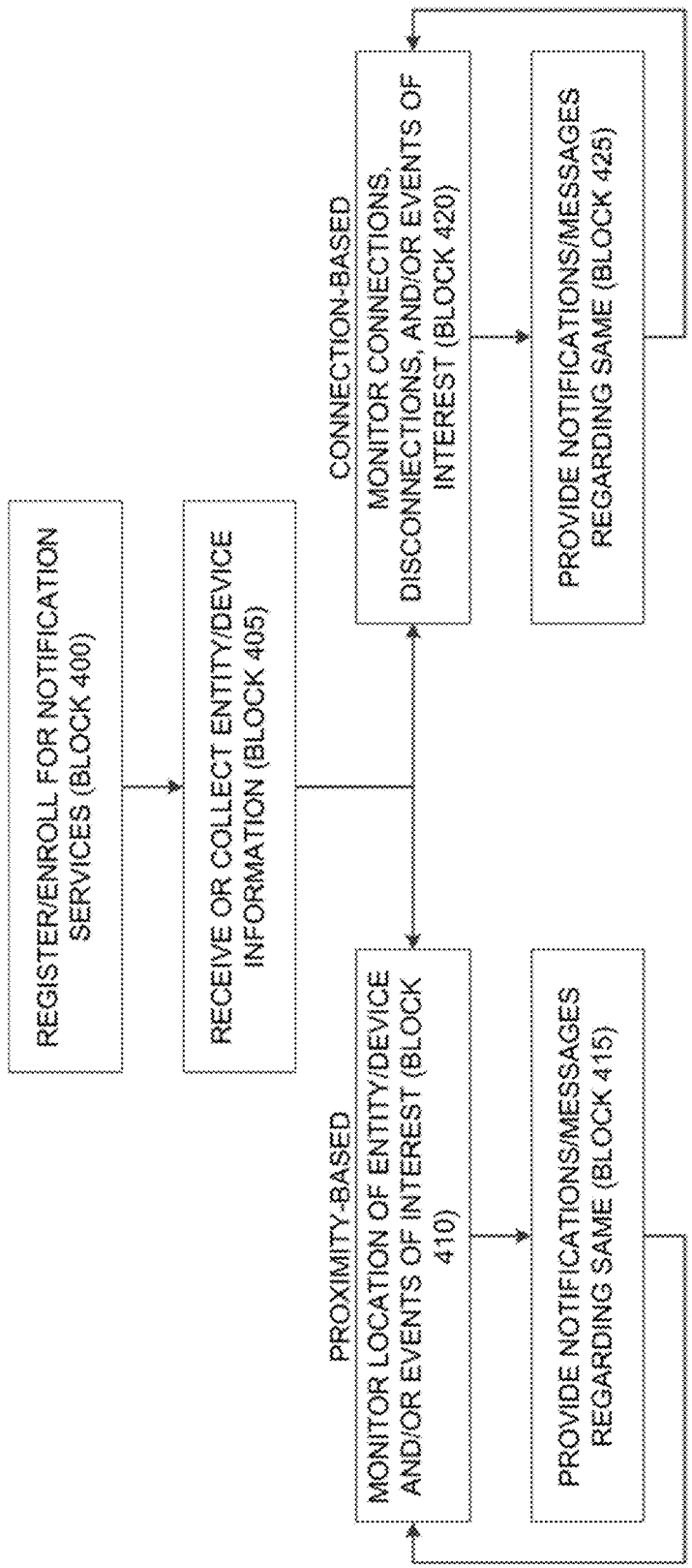
FIG. 4 is a flowchart illustrating operations and processes that can be used in accordance with various embodiments of the present invention.

Reference will now be made to FIGS. 4-12. FIG. 4 is a flowchart illustrating operations and processes that can be used in accordance with various embodiments of the present invention. FIGS. 5-12 are exemplary input and output produced in accordance with various embodiments of the present invention.

1. Registration

In one embodiment, as indicated in Block 400 of FIG. 4, the process may begin with the enrollment/registration of one or more users for an account, subscription, program, and/or similar words used herein interchangeably for notification/message services. As previously noted, a user may be an individual, a family, a family member, a company, an organization, an entity, a department within an organization, a representative of an organization and/or person, and/or the like. To register, a user (e.g., a user or user representative operating a user computing entity 115) may access a webpage, application, dashboard, browser, or portal of an entity that provides notification/message services. Such entities may include schools, school boards, bus services, daycares, transportation and logistics companies, restaurants, retailers, and/or the like. As will be recognized, a variety of entities can provide notification/message services to adapt to various needs and circumstances.

In one embodiment, as part of the enrollment/registration process, a user (e.g., a user or user representative operating a user computing entity 115) may be requested to provide information/data (e.g., including user information/data, biographic information/data, geographic information/data, device or entity information/data, payment information/data, and/or the like) by the monitoring computing entity 100 (e.g., via the registration module). The information/data may be manually input by a user; may be automatically provided by allowing access to other accounts, such as Amazon.com, Facebook, Gmail, Twitter, PayPal, and/or the like; may be automatically collected by various computing entities (including automatic device identification); combinations thereof; and/or other techniques and approaches. For instance, the biographic information/data may include the user's name, such as a first name, a last name, a company name, an entity name, an organization name, and/or the like. The geographic information/data may also include one or more physical addresses associated with the user (e.g., street address, city, state, postal code, and/or country). The physical addresses may be residential or commercial addresses, geocodes, latitude and longitude points, virtual addresses, and/or the like.

In one embodiment, the user information/data may include one or more communication formats for communicating with the user. The communication formats may include text messages (e.g., SMS, MMS), email messages, voice messages, video messages (e.g., YouTube, the Vine), picture messages (e.g., Instagram), social media messages (e.g., private social media created internally for entities, business social media (e.g., Yammer, SocialCast), or public social media (e.g., Facebook, Instagram, Twitter)), and/or a variety of other messages in various communication formats. In addition to the one or more communication formats, the user (e.g., operating a user computing entity 115) can provide the corresponding electronic destination addresses to be used in providing information/data associated with the notification/message services to the user (e.g., email addresses, online handles, phone numbers, usernames, etc.). For instance, for text messages, the user may provide one or more cellular phone numbers. For email messages, the user may provide one or more email addresses. And for voice messages, the user may provide one or more cellular or landline phone numbers or other electronic destination addresses to which audio files can be delivered. Additionally, in one embodiment, validation operations can be performed with respect to each input electronic destination address—to ensure accuracy. As will be recognized, a variety of other types of electronic destination addresses can be used to adapt to various needs and circumstances.

As will be recognized, the notification/message services may be provided as a free service or as a paid service. In certain embodiments, the user (e.g., a user or user representative operating a user computing entity 115) may be requested to provide payment information/data. Payments (e.g., the payment information/data) may be in a variety of forms, such as via debit cards, credit cards, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like. Such payments may be made using a variety of techniques and approaches, including through NFC technologies such as PayPass, Android Beam, S Beam, BLE, and various other contactless payment systems. Further, such payment technologies may include PayPal Beacon, Booker, Erply, Leaf, Leapset, Micros, PayPal Here, Revel, ShopKeep, TouchBistro, Vend, and/or the like.

Figure 5:

In one embodiment, as indicated in Block 405 of FIG. 4, device or entity information/data may also be received, provided, detected, assigned, collected, requested, and/or similar words used herein interchangeably as part of the registration/enrollment process. As will be recognized, device or entity information/data may be collected for any number of devices or entities for association with a user's account, subscription, program, and/or similar words used herein interchangeably for notification/message services. For example, a mother (e.g., operating a user computing entity 115) may provide device or entity information/data (e.g., information/data associated with a user computing entity 115 for each child) for each of her three children to enroll/register each child for notifications/messages services—e.g., to be notified when each child gets on a school bus, gets off a school bus, arrives at school, leaves school, enters or exits a classroom, enters or exits a lunchroom, enters or exits the playground, and/or the like. As previously noted, embodiments of the present invention are not limited to this context; rather, these examples are provided for understanding various embodiments of the present invention. The device or entity information/data may include one or more entity or device identifiers—phone numbers, Subscriber Identity Module (SIM) numbers, Media Access Control (MAC) addresses, International Mobile Subscriber Identity (IMSI) numbers, Internet Protocol (IP) addresses, Mobile Equipment Identifiers (MEIDs), unit identifiers (e.g., GPS unit identifiers, Unique Device Identifiers (UDiDs), mobile identification numbers (MINs), IMSI_S (Short IMSIs), email addresses, usernames, Globally Unique Identifiers (GUIDs), Integrated Circuit Card Identifiers (ICC-IDs), electronic serial numbers (ESN), International Mobile Equipment Identities (IMEIs), Wi-Fi IDs, RFID tags, and/or the like. The device or entity information/data may include a device's vendor, model, specification authority, version, components, software specification and/or version, person associated with the device, and/or the like. The device or entity information/data may be used to track, monitor, connect with, communicate with, and/or the like the corresponding devices or entities. FIG. 5 shows an exemplary interface with the devices associated with the given account. As shown in this figure, any information/data can be shown with regard to each corresponding device (including the names, nicknames, assigned names, and/or the like with whom the devices are associated).

In one embodiment, with the appropriate information/data, the monitoring computing entity 100 may create a user profile for the user via the enrollment/registration process. Accordingly, the monitoring computing entity 100 may create, store, and/or have access to various user profiles and/or information/data associated with the user profiles. In addition to at least the information/data described above, a user profile may include one or more corresponding usernames, passwords, images, tokens, challenge phrases, reminders, and/or the like (referred to herein as credentials) for accessing accounts, applications, services, entities, and/or the like.

Figure 6:
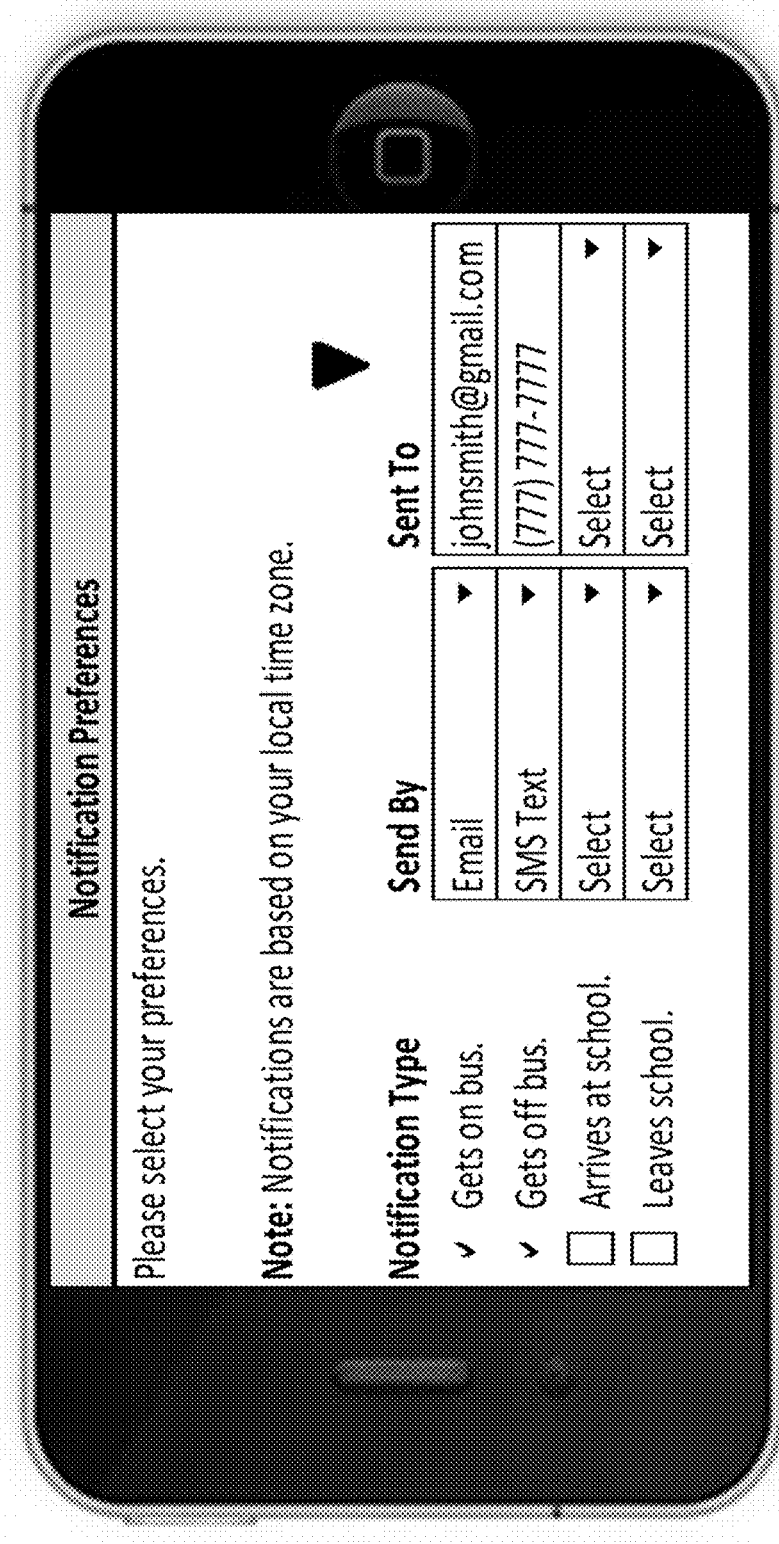

In one embodiment, once a user profile has been created by the monitoring computing entity 100, the user (e.g., operating a user computing entity 115) can provide various preferences related to the notification/message services. For instance, the user (e.g., operating a user computing entity 115) can provide a variety of preferences, including notification/message preferences regarding various events of interest. By way of example, the user (e.g., a user or user representative operating a user computing entity 115) may select, define, or otherwise configure the notifications/messages he or she wishes to receive based at least in part on events of interest. For example, as shown in FIG. 6, in the context of schools, school boards, bus services, and/or daycares, the user (e.g., operating a user computing entity 115) may select to receive notification/message services about her children and certain events of interest associated with their school day. For example, the notification/message services may be used to notify parents about particular events of interest, such as when their children get on or off of a bus; when their children arrive a specific location (e.g., an intersection, a school, or facility); when their children enter a classroom, school, or other facility; when their children have been on a bus for a period of time that meets or exceeds a configurable threshold; and/or the like. These notification/message services can also be provided to teachers, bus drivers, administrators, and/or the like. Similarly, in the context of a restaurant or retailer, the user (e.g., operating a user computing entity 115) may select to receive notification/message services of events of interest, such as when the user enters a mall, when the user approaches a mystery shopper, when the user approaches different areas of a store, when the user is within a specified distance from a restaurant or a retailer, and/or the like. These notification/message services may provide information about events of interest and/or the like. In the context of a transportation and logistics company, the user (e.g., operating a user computing entity 115) may select to receive notification/message services of events of interest, such as when various triggering events occur for items (an item may be one or more packages, parcels, bags, containers, loads, crates, items banded together, vehicle parts, pallets, drums, the like, and/or similar words used herein interchangeably) being transported by the transportation and logistics company. For example, in the transportation and logistics context, the events of interest may be when an item's location is at a particular facility, when an item's location is in a vehicle near the intended recipient of the item (e.g., both the item and the intended recipient are moving), and/or the like. In other embodiments, the entity may define the notification/message services for events of interest that are provided and may limit the choices or selections available to the user. As will be recognized, embodiments of the present invention can be modified to adapt to a variety of needs and circumstances.

2. Notification/Message Services

As will be described in greater detail below, the monitoring computing entity 100 (and/or other appropriately configured computing entities) can automatically provide (e.g., generate, queue, and/or transmit) one or more notifications/messages in compliance with users' notification/message preferences for the for events of interest. Similarly, the monitoring computing entity 100 (and/or other appropriately configured computing entities) can automatically provide the one or more notifications/messages to the electronic destination addresses in compliance with the users' notification/message preferences. For example, the monitoring computing entity 100 may generate, queue, and/or transmit an email message to a user's email address, a text message to a user's cellular phone, a notification/message to a designated application, and/or the like for various events of interest as defined in the user notification/message preferences.

To provide such notification/message services, one or more connection/proximity computing entities 110 may be fixed or mobile with regard to their geographic locations. In one embodiment, connection/proximity computing entities 110 may be fixed with regard to their geographic locations, such as by being in fixed positions at school entrances, bus stops, mall entrances, aisles of a store, in classrooms, on playgrounds, at intersections, on light poles, in cafeterias or hallways, on bridges, and/or the like. In another embodiment, connection/proximity computing entities 110 may be mobile with regard to their geographic locations. For example, one or more of the connection/proximity computing entities 110 may be disposed on school buses, worn by school bus drivers, attached to package delivery vehicles, attached to mobile shipping containers, affixed to shopping carts or wheelchairs, positioned in passenger vehicles, and/or the like. As will be recognized, user computing entities 115 may also be mobile with regard to their geographic locations by being carried or worn by the respective users, attached to vehicles, and/or the like. As will be recognized, a variety of other approaches and techniques can be used to adapt to various needs and circumstances.

a. Proximity-Based Embodiments

In one embodiment, the monitoring computing entity 100 (and/or a variety of other computing entities) may perform proximity-based monitoring to provide notifications/messages services for various users (Block 410 of FIG. 4).

In one embodiment, the monitoring computing entity 100 (and/or a variety of other computing entities) may perform proximity-based monitoring regularly, periodically, continuously, during certain time periods or time frames, on certain days, upon determining the occurrence of one or more predefined triggers/events, combinations thereof, and/or the like. For example, for restaurant-related notifications/messages, the appropriate computing entity may continuously monitor computing entities or only monitor computing entities during the open hours of the corresponding restaurant. In the school context, the appropriate computing entity may monitor 24 hours a day or monitor during school hours (in addition to a configurable time window before and after school).

In one embodiment, the appropriate computing entities can monitor the locations of the various computing entities upon determining the occurrence of one or more predefined triggers/events and/or the like. The one or more predefined triggers/events may include a vehicle in which the connection/proximity computing entity 110 is disposed (a) being turned on or off; (b) beginning to move; (c) slowing to a stop; (d) moving out of a geo-fenced area; (e) moving into a geo-fenced area; (f) beginning to move in a forward direction; (g) being placed in the park position; and/or a variety of other triggers/events. As will be recognized, a variety of other triggers/events can be used to adapt to various needs and circumstances. If a predefined trigger/event is not detected, an appropriate computing entity (e.g., monitoring computing entity 100) can determine/identify whether a configurable time period has begun or ended. If the appropriate computing entity (e.g., monitoring computing entity 100) determines/identifies that the configurable time period has not begun or ended, the appropriate computing entity (e.g., monitoring computing entity 100) can continue monitoring for predefined triggers/events. However, if the appropriate computing entity (e.g., monitoring computing entity 100) determines/identifies that the configurable time period has begun or ended, the appropriate computing entity (e.g., monitoring computing entity 100) can continuously monitor whether one or more connection/proximity computing entities 110 are within a configurable distance from one or more user computing entities 115. The monitoring may continue indefinitely, until the occurrence of one or more predefined triggers/events, until a configurable time period has elapsed, combinations thereof, and/or the like.

Generally, the locations of one or more connection/proximity computing entities 110 and/or one or more of the user computing entities 115 can be monitored by any of a variety of computing entities—including monitoring computing entities 100, connection/proximity computing entities 110, user computing entities 115, and/or the like. For example, the locations of one or more of the connection/proximity computing entities 110 and/or one or more of the user computing entities 115 may be monitored with the aid of or in coordination with location-determining devices, location-determining aspects, location-determining features, location-determining functionality, location-determining sensors, and/or other location services. Such may include GPS; cellular assisted GPS; real time location systems or server technologies using received signal strength indicators from a Wi-Fi network); triangulating positions in connection with a variety of other systems, including cellular towers, Wi-Fi access points, and/or the like; and/or the like. By using the locations of one or more of the connection/proximity computing entities 110 and/or one or more of the user computing entities 115, an appropriate computing entity (e.g., monitoring computing entity 100) can determine, for example, when a connection/proximity computing entity 110 and a user computing entity 115 are within a configurable distance from one another.

In one embodiment, the configurable distance may be a distance, range, zone of confidence, geofence, tolerance, and/or similar words used herein interchangeably. For example, in one embodiment, the configurable distance may be plus or minus (±) a specific distance or range using a coordinate system (e.g., DD, DMS, UTM, and/or UPS). As will be recognized, a configurable distance may be in a variety of formats, such as degrees, minutes, seconds, feet, meters, miles (e.g., 3, 15, 30, or 50 feet), kilometers, and/or the like. Continuing with the above example, the monitoring computing entity 100 may use a configurable distance of ±0.000001, ±0.000001 in the DD coordinate system (or configurable distances of ±0.000100, ±0.000100 or ±0.000010, ±0.000010) to determine/identify when a connection/proximity computing entity 110 and a user computing entity 115 registered for notification/message services are within a configurable distance of each other. For instance, assume a school bus with a connection/proximity computing entity 110 disposed thereon or carried by a driver stops at 33.7869128, −84.3875602 to pick up children, and the user computing entity 115 for Johnny Smith (Johnny Smith's phone) is located at 33.7869129, −84.3875601, the two entities would be within the configurable distance of ±0.000001, ±0.000001. The appropriate computing entity (e.g., monitoring computing entity 100) monitoring the entities can make this determination/identification.

In the event two entities are within a configurable distance from each other (e.g., associated with one another), an appropriate computing entity (e.g., monitoring computing entity 100) can make this determination/identification and indicate or provide an indication of the same (e.g., that the user computing entity 115 (for Johnny Smith) is within the configurable distance of the connection/proximity computing entity 110 disposed on the particular school bus). The indication may include device or entity information/data associated with the corresponding connection/proximity computing entity 110 and/or user computing entity 115, such as the corresponding device identifiers and names. The indication may also include other information/data, such as the location at which the entities became within the configurable distance of each other, the time at which the entities became within the configurable distance of each other, the type of event (e.g., entering or exiting school, getting on or off a bus, and/or the like), and/or the like. The appropriate computing entity can determine/identify the type of event and determine/identify whether the event is an event of interest based on the corresponding identities, for example, and location of the connection/proximity computing entity 110, the time of day, the identity of the user computing entity 115, and/or the like. The appropriate computing entity (e.g., monitoring computing entity 100) can then store the information/data in one more records and/or in association with the account, subscription, program, and/or the like corresponding the user computing entity 115.

Further, by using the locations of one or more of the connection/proximity computing entities 110 and/or one or more of the user computing entities 115, an appropriate computing entity (e.g., monitoring computing entity 100) can determine, for example, when a connection/proximity computing entity 110 and a user computing entity 115 are no longer within a configurable distance from one another (e.g., disassociated with one another). For instance, assume a school bus with a connection/proximity computing entity 110 disposed thereon or carried by a driver stops at 33.7869128, −84.3875602 to drop off children. Within a few seconds or minutes of leaving the stop, the connection/proximity computing entity 110 is located at 33.7872895, −84.38600 and the user computing entity 115 for Johnny Smith (Johnny Smith's phone) is located at 33.7869100, −84.3875312, the two entities would no longer be within the configurable distance of ±0.000001, ±0.000001 (e.g., associated with one another). In the event two entities are no longer within the configurable distance from each other, an appropriate computing entity (e.g., monitoring computing entity 100) can make this determination/identification and indicate or provide an indication that the user computing entity 115 (for Johnny Smith) is no longer within the configurable distance of the connection/proximity computing entity 110 disposed on the school bus. The indication may include device or entity information/data associated with the corresponding connection/proximity computing entity 110 and/or user computing entity 115, such as the corresponding device identifiers and names. The indication may also include other information/data, such as the time and location at which the entities were no longer within the configurable distance of each other, the type of event, and/or the like. The appropriate computing entity can determine/identify the type of event and determine whether the event is an event of interest based on the corresponding identities, for example, and location of the connection/proximity computing entity 110, the time of day, the identity of the user computing entity 115, and/or the like. The appropriate computing entity (e.g., monitoring computing entity 100) can then store the information/data in one more records and/or in association with the account, subscription, program, and/or the like corresponding the user computing entity 115.

FIG. 7 is an example of information/data stored by the monitoring computing entity 100 for events of interest associated with Johnny Smith's phone. As can be seen from this figure, the monitoring computing entity 100 (or other appropriate computing entity) can store each event of interest, an event number, a date of the event, a time of the event, the location of the event, a user or user computing entity 115 associated with the event, and/or the like. In this example, the records comprise information/data for Johnny Smith's school-related events on May 14, 2014. In particular, the records indicate when and where Johnny got on and off the bus in the morning, when and where he entered and exited the school, and when and where he got on and off the bus in the afternoon. As previously described, a variety of information/data associated with the various events can be record and stored in records.

The appropriate computing entity can also provide notifications/messages in accordance with users' notification/message preferences (Block 415 of FIG. 4). In one embodiment, the monitoring computing entity 100 (or other appropriate computing entity) can provide notifications/messages as particular events of interests occur (e.g., are determined/identified by the appropriate computing entity), on a periodic or regular basis, and/or in response to other triggers/events or requests. In one embodiment, when the appropriate computing entity determines/identifies an event of interest by monitoring the locations of connection/proximity computing entities 110 and/or user computing entities 115 (e.g., when a child gets on a school bus, gets off a school bus, arrives at school, leaves school, enters or exits a classroom, enters or exits a lunchroom, enters or exits the playground, and/or the like), the appropriate computing entity can automatically provide (e.g., generate, queue, and/or transmit) one or more notifications/messages in compliance with the corresponding notification/message preferences. For example, when the monitoring computing entity 100 determines/identifies that Johnny Smith (Johnny Smith's phone) is within the configurable distance of his school bus (School Bus #8), the monitoring computing entity 100 can automatically provide (e.g., generate, queue, and/or transmit) one or more notifications/messages to the email address shown in FIG. 6 (provided it is an event of interest). Similarly, when the monitoring computing entity 100 determines/identifies that Johnny Smith (Johnny Smith's phone) is no longer within the configurable distance of his school bus (School Bus #8), the monitoring computing entity 100 can automatically provide (e.g., generate, queue, and/or transmit) one or more notifications/messages to the electronic destination address shown in FIG. 6 (provided it is an event of interest).

Figure 8:
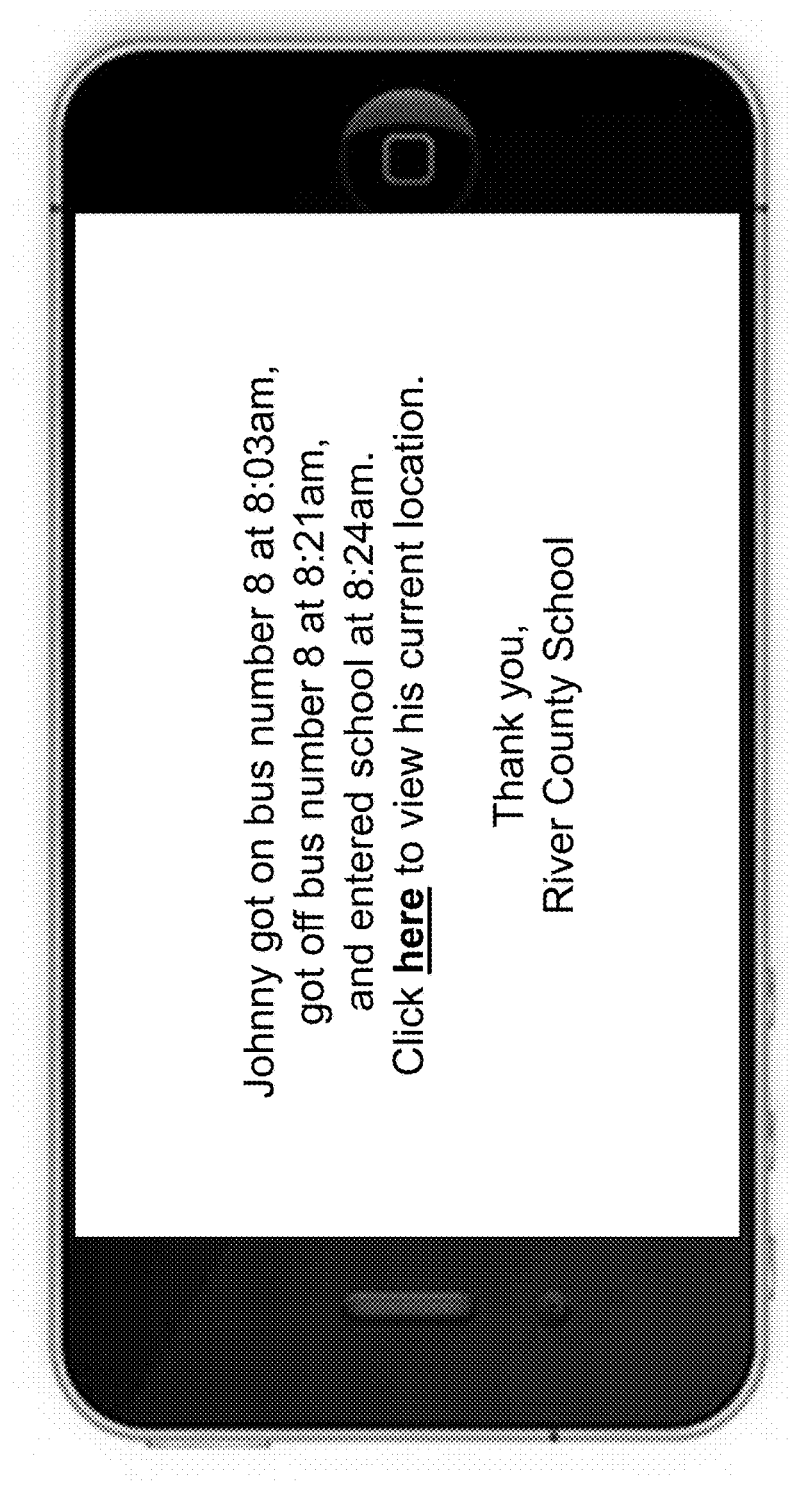
Figure 9:
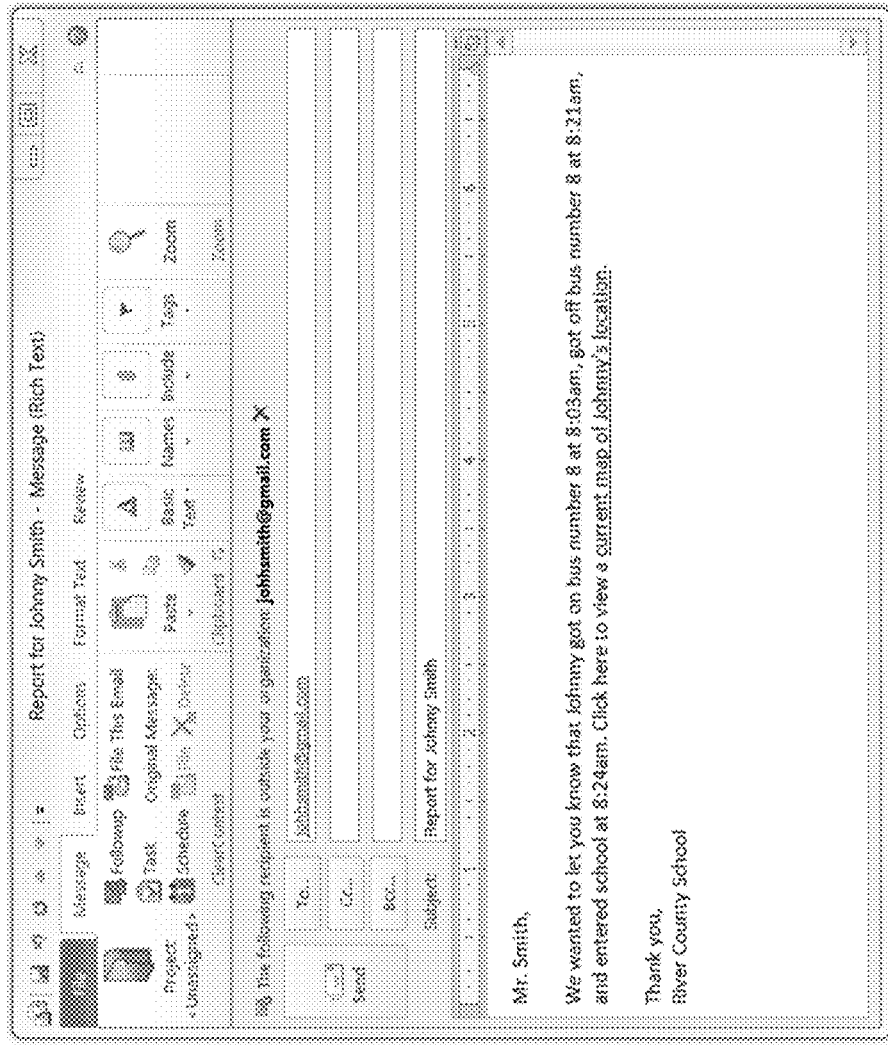
Figure 10:
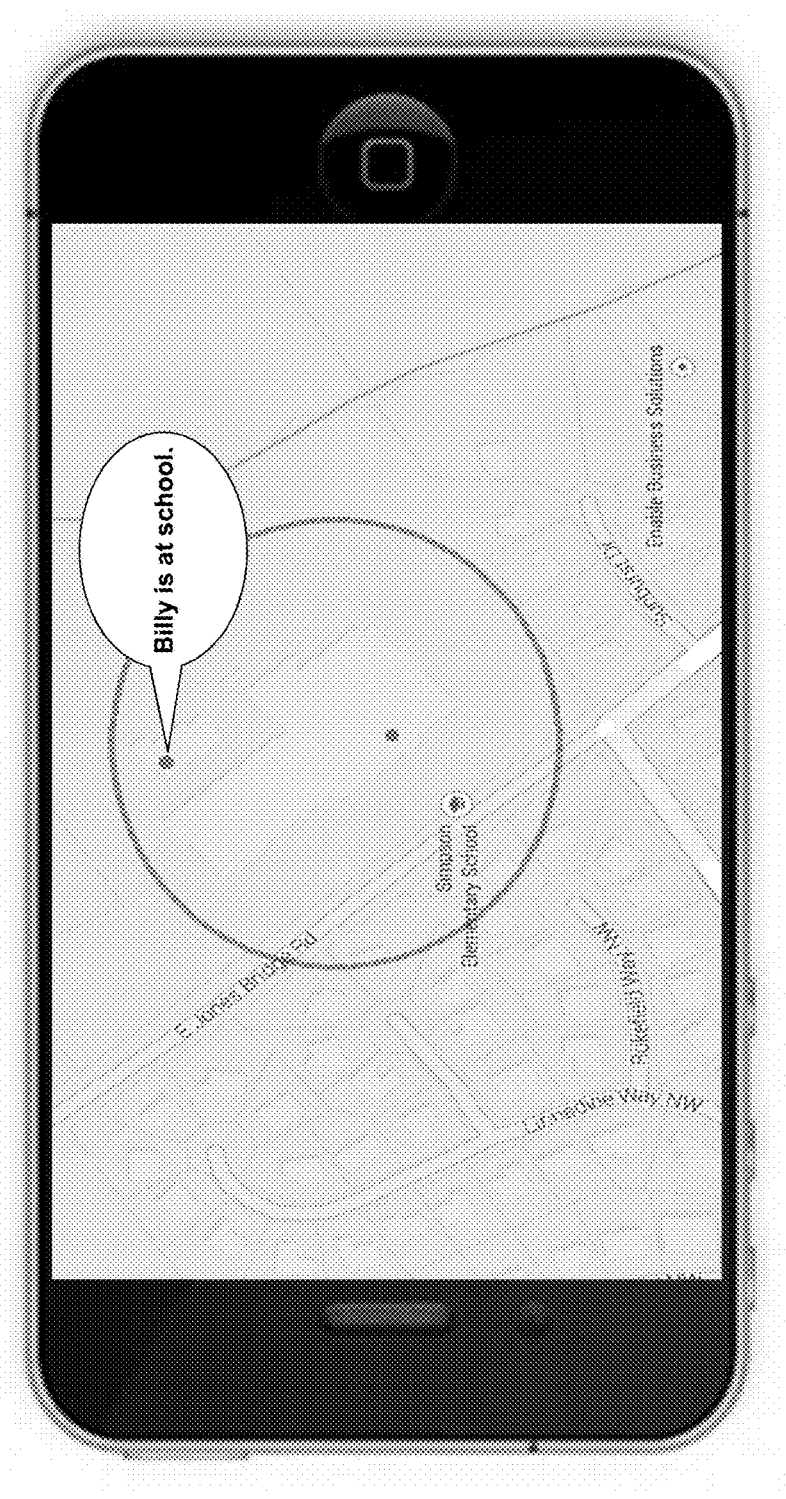
Figure 11:
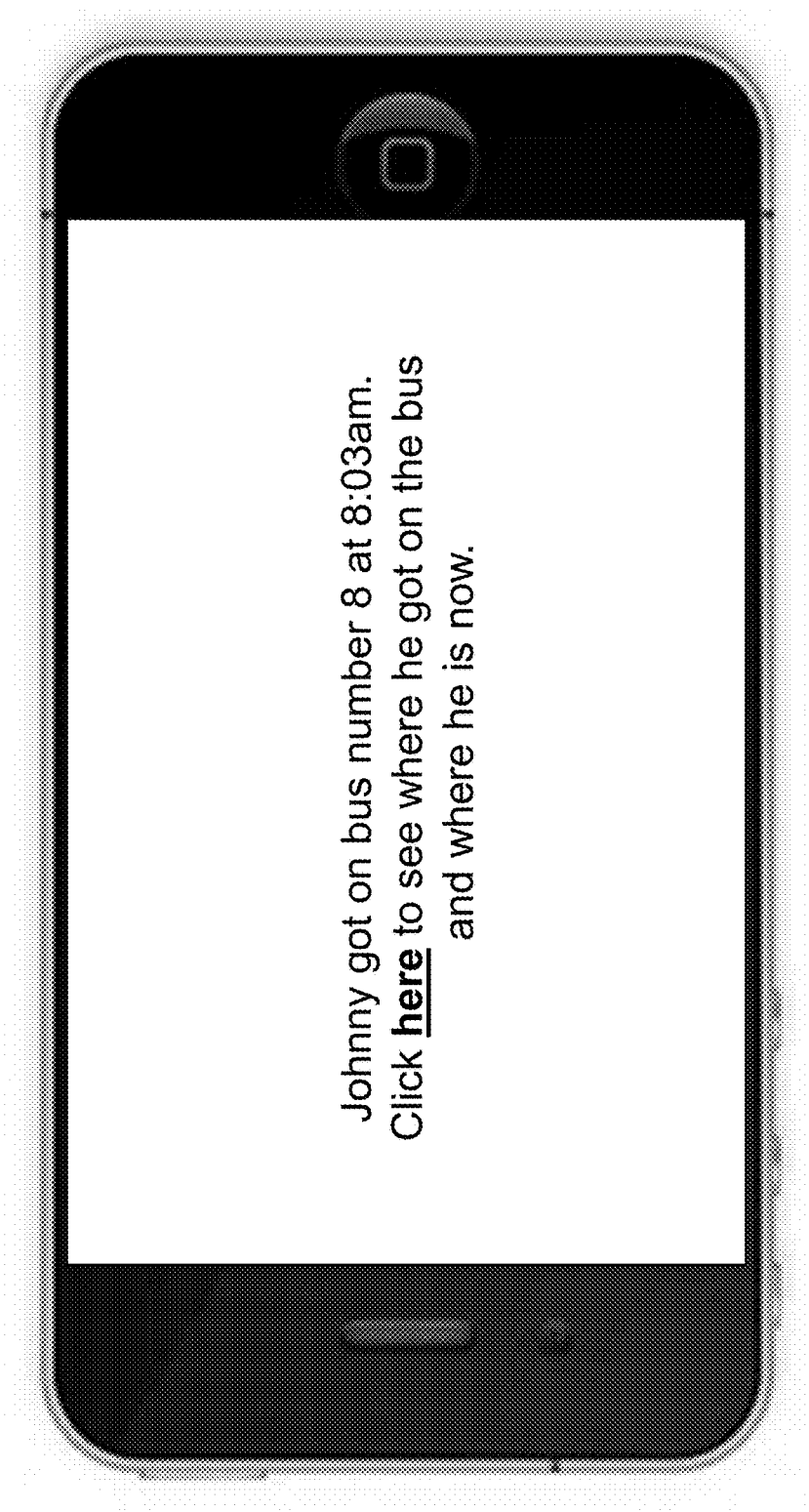
Figure 12:
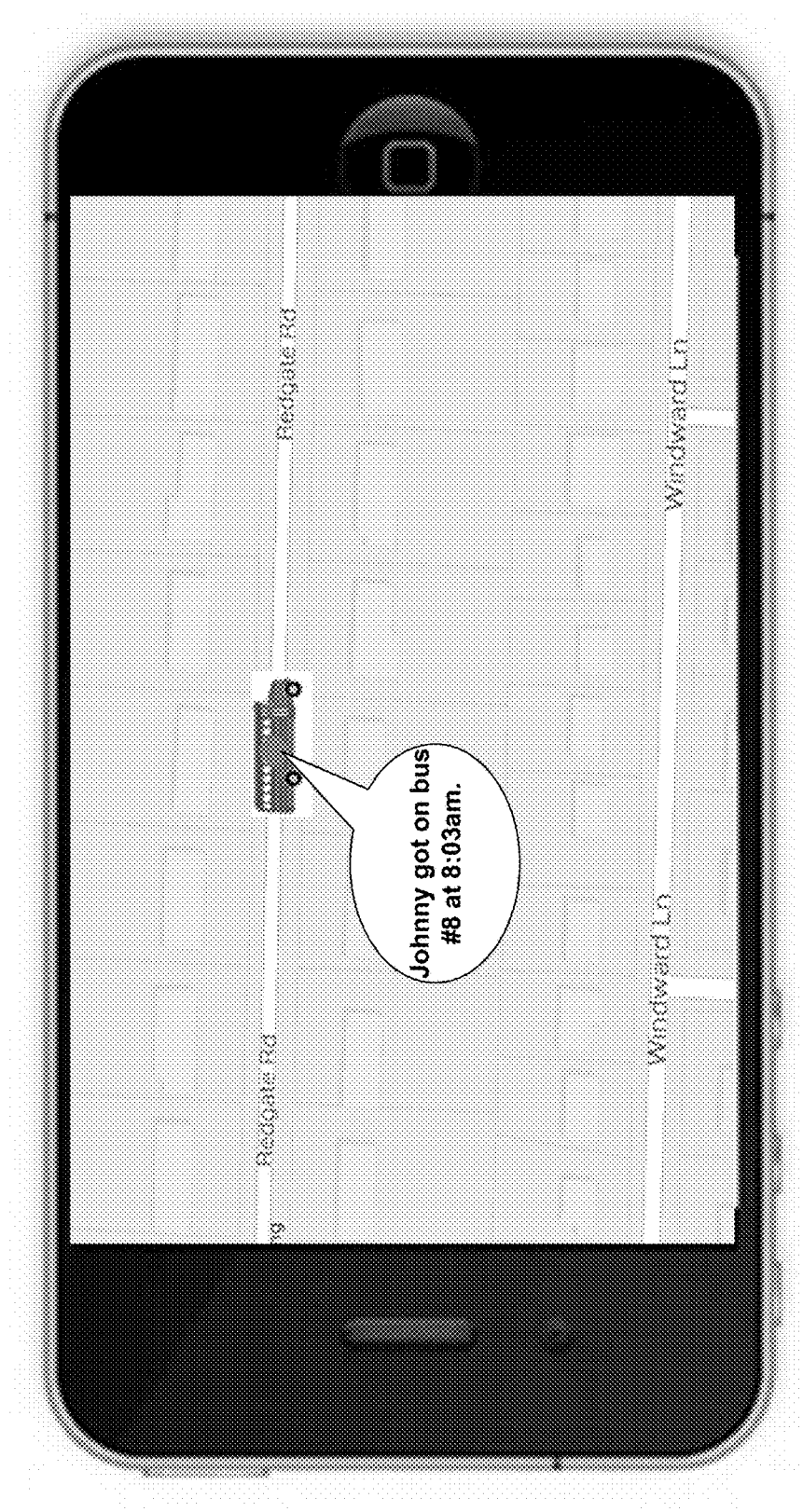

As will be recognized, a variety of types of messages can be provided to various electronic destination addresses in response determining/identifying events of interest. FIGS. 8-9 and 11-12 show exemplary notifications/messages providing information/data regarding various events of interest. For example, FIGS. 8 and 9 show notifications/messages (e.g., a text message and an email message) that include a report with information/data about Johnny's school-related activities on the morning of May 14, 2014. Such notifications/messages may include links or access to sources of Johnny's real time location. The links or access to information/data sources may be used to provide real-time location information/data of the corresponding user computing entity 115 (see FIG. 10). Such notifications/messages can be provided on a periodic or regular basis and/or in response to certain triggers/events (e.g., entering school). FIGS. 11 and 12 show notifications/messages that are provided in real time, for example, in response to the monitoring computing entity 100 determining/identifying the occurrence of one or more events of interest. In FIGS. 11 and 12, the notifications/messages provide information/data about Johnny getting on bus number 8 at 8:03 am on May 14, 2014.

As will be recognized, the notifications/messages can be provided in accordance with users' notification/message preferences. For instance, the monitoring computing entity 100 (and/or other appropriately configured computing entities) can automatically generate, queue, and/or transmit (e.g., provide) email messages to email addresses, text messages to cellular phones or applications, notifications/messages to designated applications, and/or the like. The notifications/messages can be provided periodically, regularly, and/or in response to the occurrence of various events of interest.

b. Connection-Based Embodiments

As will be recognized, certain communication technologies and protocols have range limitations for directly connecting to and/or directly communicating with computing entities (e.g., point-to-point, peer-to-peer, WLAN, WPAN, and/or the like). For example, various Bluetooth technologies may have range limitations from 20 feet to 300 feet. NFC technologies may have range limitations of less than 12 inches. Wi-Fi Direct may have range limitations of 600 feet. Thus, depending on the application or context of the notifications desired, various communication technologies and protocols can be used to adapt to various needs and circumstances. For instance, Bluetooth technologies may be used to determine/identify when a child is on (e.g., connected to) a school bus. Wi-Fi Direct technologies may be used to determine/identify when a child is at school. NFC technologies may be used to determine when a person is at a checkout, near a particular display in a store, being waitlisted at a restaurant, and/or the like. As will be recognized, a variety of other approaches and techniques can be used to adapt to various needs and circumstances.

In one embodiment, an appropriate computing (e.g., monitoring computing entity 100) can provide notifications when registered user computing entities 115 connect to or disconnect from appropriately designated connection/proximity computing entities 110. For instance, in the Bluetooth context, a connection/proximity computing entity 110 can connect with multiple devices simultaneously with each device being with 30-foot radius. In essence, Bluetooth systems create personal-area networks (PANs) or piconets that may fill an area, room, or vehicle. To create a connection between a connection/proximity computing entity 110 and a user computing entity 115 a trusted relationship is established between the devices using a password (e.g., credential information/data) that can be stored by each device for future connection attempts (e.g., the devices are paired). After computing entities have been paired, establishing a connection begins with a phase called "inquiry" through which a connection/proximity computing entity 110 sends an inquiry request to all user computing entities 115 found within its range. The user computing entities 115 within range would then receive the query and reply. The connection/proximity computing entity 110 then synchronizes with the various user computing entities 115 within range. Once the computing entities are connected (e.g., the connection is established), the monitoring computing entity 100 can provide notifications/messages regarding the same. Likewise, when the two computing entities are no connected (e.g., the connection is lost), the monitoring computing entity 100 can also provide notifications/messages regarding the same. As will be recognized, other communication technologies and protocols (e.g., NFC, Wibree, HomeRF, SWAP, Wi-Fi Direct, and/or the like) can be used in a similar manner in terms of connecting and disconnecting with user computing entities 115. That is, the other communication technologies and protocols can establish connections between connection/proximity computing entities 110 and user computing entities 115.

In one embodiment, the monitoring computing entity 100 (and/or a variety of other computing entities) may perform connection-based monitoring regularly, periodically, continuously, during certain time periods or time frames, on certain days, upon determining the occurrence of one or more predefined triggers/events, combinations thereof, and/ or the like (Block 420 of FIG. 4). For example, for restaurant-related notifications/messages, the appropriate computing entity may continuously monitor connections or only monitor connections during the open hours of the corresponding restaurant. In the school context, the appropriate computing entity may monitor connections 24 hours a day or monitor connections during school hours (in addition to a configurable time window before and after school).

In one embodiment, the appropriate computing entities can monitor connections to various computing entities upon determining the occurrence of one or more predefined triggers/events and/or the like. The one or more predefined triggers/events may include a vehicle in which the connection/proximity computing entity 110 is disposed (a) being turned on or off; (b) beginning to move; (c) slowing to a stop; (d) moving out of a geo-fenced area; (e) moving into a geo-fenced area; (f) beginning to move in a forward direction; (g) being placed in the park position; and/or a variety of other triggers/events. As will be recognized, a variety of other triggers/events can be used to adapt to various needs and circumstances. If a predefined trigger/event is not detected, an appropriate computing entity (e.g., monitoring computing entity 100) can determine/identify whether a configurable time period has begun or ended. If the appropriate computing entity (e.g., monitoring computing entity 100) determines/identifies that the configurable time period has not begun or ended, the appropriate computing entity (e.g., monitoring computing entity 100) can continue monitoring for predefined triggers/events. However, if the appropriate computing entity (e.g., monitoring computing entity 100) determines/identifies that the configurable time period has begun or ended, the appropriate computing entity (e.g., monitoring computing entity 100) can continuously monitor whether one or more connection/proximity computing entities 110 are connected to (e.g., communicating with) one or more user computing entities 115. The monitoring may continue indefinitely, until the occurrence of one or more predefined triggers/events, until a configurable time period has elapsed, combinations thereof, and/or the like.

Generally, the connections between one or more connection/proximity computing entities 110 and/or one or more of the user computing entities 115 can be monitored by any of a variety of computing entities—including monitoring computing entities 100, connection/proximity computing entities 110, user computing entities 115, and/or the like. Continuing with the above example, the monitoring computing entity 100 may determine/identify when a connection/proximity computing entity 110 and a user computing entity 115 registered for notification/message services are connected (e.g., communicating with one another). For instance, assume a school bus with a connection/proximity computing entity 110 disposed thereon or carried by a driver stops to pick up children, and the user computing entity 115 for Johnny Smith (Johnny Smith's phone) connects with the connection/proximity computing entity 110 when Johnny is within the applicable wireless range (e.g., the entities automatically connect via Bluetooth, Wi-Fi Direct, NFC). The monitoring computing entity 100 can receive an indication of the connection and/or determine/identify that the entities are connected.

In the event two entities are connected, an appropriate computing entity (e.g., monitoring computing entity 100) can make this determination/identification and indicate or provide an indication of the same (e.g., that the user computing entity 115 for Johnny Smith is connected to the connection/proximity computing entity 110 disposed on the particular school bus). The indication may include device or entity information/data associated with the corresponding connection/proximity computing entity 110 and/or user computing entity 115, such as the corresponding device identifiers and names. The indication may also include other information/data, such as the location at which the entities connected, the time at which the entities connected, the type of event (e.g., entering or exiting school, getting on or off a bus, and/or the like), and/or the like. The appropriate computing entity can determine/identify the type of event and determine/identify whether the event is an event of interest based on the corresponding identities, for example, and location of the connection/proximity computing entity 110, the time of day, the identity of the user computing entity 115, and/or the like. The appropriate computing entity (e.g., monitoring computing entity 100) can then store the information/data in one more records and/or in association with the account, subscription, program, and/or the like corresponding the user computing entity 115.

Further, by using the locations of one or more of the connection/proximity computing entities 110 and/or one or more of the user computing entities 115, an appropriate computing entity (e.g., monitoring computing entity 100) can determine, for example, when a connection/proximity computing entity 110 and a user computing entity 115 are no longer connected (e.g., disconnected). For instance, assume a school bus with a connection/proximity computing entity 110 disposed thereon stops to drop off children. Within a few seconds or minutes of leaving the stop (depending upon the range limitations), the connection/proximity computing entity 110 and the user computing entity 115 for Johnny Smith (Johnny Smith's phone) are no longer connected based on the distance between the entities (e.g., the connection is lost). In the event two entities are no longer connected, an appropriate computing entity (e.g., monitoring computing entity 100) can make this determination/identification and indicate or provide an indication that the user computing entity 115 (for Johnny Smith) is no longer connected to the connection/proximity computing entity 110 disposed on the school bus. The indication may include device or entity information/data associated with the corresponding connection/proximity computing entity 110 and/or user computing entity 115, such as the corresponding device identifiers and names. The indication may also include other information/data, such as the time and location at which the entities disconnected, the type of event, and/or the like. The appropriate computing entity can determine/identify the type of event and determine/identify whether the event is an event of interest based on the corresponding identities, for example, and location of the connection/proximity computing entity 110, the time of day, the identity of the user computing entity 115, and/or the like. The appropriate computing entity (e.g., monitoring computing entity 100) can then store the information/data in one more records and/or in association with the account, subscription, program, and/or the like corresponding the user computing entity 115.

FIG. 7 is an example of information/data stored by the monitoring computing entity 100 for events of interest associated with Johnny Smith's phone. As can be seen from this figure, the monitoring computing entity 100 (or other appropriate computing entity) can store each event of interest, an event number, a date of the event, a time of the event, the location of the event, a user or user computing entity 115 associated with the event, and/or the like. In this example, the records comprise information/data for Johnny Smith's school-related events on May 14, 2014. In particular, the records indicate when and where Johnny got on and off the bus in the morning, when and where he entered and exited the school, and when and where he got on and off the bus in the afternoon. As previously described, a variety of information/data associated with the various events can be record and stored in records.

The appropriate computing entity can also provide notifications/messages in accordance with users' notification/message preferences (Block 425 of FIG. 4). In one embodiment, the monitoring computing entity 100 (or other appropriate computing entity) can provide notifications/messages as particular events of interests occur (e.g., are determined/identified by the appropriate computing entity), on a periodic or regular basis, and/or in response to other triggers/events or requests. In one embodiment, when the appropriate computing entity determines/identifies an event of interest by monitoring connections to connection/proximity computing entities 110 (e.g., when each child gets on a school bus, gets off a school bus, arrives at school, leaves school, enters or exits a classroom, enters or exits a lunchroom, enters or exits the playground, and/or the like), the appropriate computing entity can automatically provide (e.g., generate, queue, and/or transmit) one or more notifications/messages in compliance with the corresponding notification/message preferences. For example, when the monitoring computing entity 100 determines/identifies that Johnny Smith (Johnny Smith's phone) is connected to the connection/proximity computing entity 110 on his school bus (School Bus #8), the monitoring computing entity 100 can automatically provide (e.g., generate, queue, and/or transmit) one or more notifications/messages the email address shown in FIG. 6 (provided it is an event of interest). Similarly, when the monitoring computing entity 100 determines/identifies that Johnny Smith (Johnny Smith's phone) is no longer connected to connection/proximity computing entity 110 on his school bus (School Bus #8), the monitoring computing entity 100 can automatically provide (e.g., generate, queue, and/or transmit) one or more notifications/messages to the electronic destination address shown in FIG. 6 (provide it is an event of interest).

As will be recognized, a variety of types of messages can be provided to various electronic destination addresses in response determining/identifying events of interest. FIGS. 8-9 and 11-12 show exemplary notifications/messages providing information/data regarding various events of interest. For example, FIGS. 8 and 9 show notifications/messages (e.g., a text message and an email message) that include a report with information/data about Johnny's school-related activities on the morning of May 14, 2014. Such notifications/messages may include links or access to sources of Johnny's real time location. The links or access to information/data sources may be used to provide real-time location information/data of the corresponding user computing entity 115 (see FIG. 10). Such notifications/messages can be provided on a periodic or regular basis and/or in response to certain triggers/events (e.g., entering school). FIGS. 11 and 12 show notifications/messages that are provided in real time, for example, in response to the monitoring computing entity 100 determining/identifying the occurrence of one or more events of interest. In FIGS. 11 and 12, the notifications/messages provide information/data about Johnny getting on bus number 8 at 8:03 am on May 14, 2014.

As will be recognized, the notifications/messages can be provided in accordance with users' notification/message preferences for events of interest. For instance, the monitoring computing entity 100 (and/or other appropriately configured computing entities) can automatically generate, queue, and/or transmit (e.g., provide) email messages to email addresses, text messages to cellular phones or applications, notifications/messages to designated applications, and/or the like. The notifications/messages can be provided periodically, regularly, and/or in response to the occurrence of various events of interest.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for providing notifications for events of interest, the method comprising:
registering, via a server entity, a first mobile computing entity for and events of interest related to the first mobile computing entity, wherein the registering the first mobile computing entity comprises automatically collecting entity information about the first mobile computing entity by establishing a connection with the first mobile computing entity using a wireless protocol, and the entity information about the first mobile computing entity comprises a unique identifier assigned to the first mobile computing entity, the events of interest correspond to a data set describing different user action types that only a user of a second mobile computing entity is selected to perform;
storing, via the server entity, a profile for a first user associated with the first mobile computing entity, the profile comprising notification preferences of a first type and a second type of the events of interest and the unique identifier assigned to the first mobile computing entity;
performing first monitoring, via the server entity and based at least in part on a particular unique identifier assigned to a third mobile computing entity, of the third mobile computing entity to track a location of the third mobile computing entity and of the second mobile computing entity to track a location of the second mobile computing entity, the third mobile computing entity being attached and fixed within a particular environment;
determining, via the server entity and based at least in part on the first monitoring, whether the third mobile computing entity and the second mobile computing entity are within a configurable distance from each other;
responsive to determining that the third mobile computing entity and the second mobile computing entity are within the configurable distance from each other:
determining and storing, via the server entity, a first location at which the third mobile computing entity and the second mobile computing entity were within the configurable distance from each other and an indication of a first time when the third mobile computing entity and the second mobile computing entity were within the configurable distance of each other,
inferring, via the server entity and based at least on the determining the first location at which the third mobile computing entity and the second mobile computing entity were within the configurable distance from each other, that the user of the second mobile computing entity has engaged in the first type of the events of interest;

automatically generating, via the server entity, a first notification to the first mobile computing entity based at least in part on, the inferring that the user of the second mobile computing entity has engaged in the first type of the events of interest performing second monitoring, via the server entity and based at least in part on the particular unique identifier assigned to the third mobile computing entity, of the third mobile computing entity to track the location of the third mobile computing entity and of the second mobile computing entity to track the location of the second mobile computing entity;

determining, via the server entity and based at least in part on the second monitoring, whether the third mobile computing entity and the second mobile computing entity are no longer within the configurable distance from each other;

responsive to determining that the third mobile computing entity and the second mobile computing entity are no longer within the configurable distance from each other, determining and storing, via the server entity, a second location at which the third mobile computing entity and the second mobile computing entity were no longer within the configurable distance from each other and an indication of a second time when the third mobile computing entity and the second mobile computing entity were no longer within the configurable distance from each other; and automatically generating, via the server entity, a second notification to the first mobile computing entity based at least in part on inferring that the user of the second mobile computing entity has engaged in the second type of the events of interest.

2. The method of claim 1, wherein the second notification comprises the second time and the second location at which the third mobile computing entity and the second mobile computing entity were no longer within the configurable distance from each other.

3. The method of claim 1, wherein the first monitoring and the second monitoring are performed on a periodic basis, a regular basis, or a continuous basis, and wherein the registering includes receiving access to a plurality of personal account services of the user in order to automatically receive at least some of the entity information from the plurality of personal account services.

4. The method of claim 1, wherein the first monitoring is performed in response to one or more triggers.

5. An apparatus comprising at least one processor and at least one memory including program code, the at least one memory and the program code configured to, with the processor, cause the apparatus to at least:

register a first mobile computing entity for providing notifications for events of interest related to the first mobile computing entity, the events of interest correspond to a data set describing different user action types that only a second user of a second mobile computing entity is selected to perform, wherein registering the first mobile computing entity comprises:

causing the first mobile computing entity to display a user interface that includes a first type of the events of interest that a first user selects to be notified of;

automatically collecting entity information about the first mobile computing entity by establishing a connection with the first mobile computing entity using a wireless protocol, and the entity information about the first mobile computing entity comprises a unique identifier assigned to the first mobile computing entity;

store a profile for the first user associated with the first mobile computing entity, the profile comprising notification preferences for the events of interest and the unique identifier assigned to the first mobile computing entity;

perform first monitoring, based at least in part on a particular unique identifier assigned to a third mobile computing entity, of the third mobile computing entity to track a location of the third mobile computing entity and of the second mobile computing entity to track a location of the second mobile computing entity, the third mobile computing entity being attached within a particular environment or being in possession of a third user;

determine, based at least in part on the first monitoring, whether the third mobile computing entity and the second mobile computing entity are within a configurable distance from each other;

responsive to determining that the third mobile computing entity and the second mobile computing entity are within the configurable distance from each other:

determine and store a first location at which the third mobile computing entity and the second mobile computing entity were within the configurable distance from each other and an indication of a first time when the third mobile computing entity and the second mobile computing entity were within the configurable distance of each other, infer, based at least on the determining the first location at which the third mobile computing entity and the second mobile computing entity were within the configurable distance from each other, that the second user of the second mobile computing has engaged in the first type of the events of interest, automatically generate a first notification to the first mobile computing entity based at least in part on an inference being made that the second user performed the first type of the events of interest, the generating of the first notification includes causing the first notification to be displayed to the first mobile computing entity corresponding to the first user, and perform second monitoring, based at least in part on the unique identifier assigned to the third mobile computing entity, of the third mobile computing entity to track the location of the third mobile computing entity and of the second mobile computing entity to track the location of the second mobile computing entity;

determine, based at least in part on the second monitoring, whether the third mobile computing entity and the second mobile computing entity are no longer within the configurable distance from each other;

responsive to determining that the third mobile computing entity and the second mobile computing entity are no longer within the configurable distance from each other, determine and store a second location at which the third mobile computing entity and the second mobile computing entity were no longer within the configurable distance from each other and an indication of a second time when the third mobile computing entity and the second mobile computing entity were no longer within the configurable distance from each other; and automatically generate a second notification to the first mobile computing entity based at least in part on the notification preferences, the generating of the second notification includes causing the second notification to be displayed to the first mobile computing entity corresponding to the first user.

6. The apparatus of claim 5, wherein the second notification comprises the second time and the second location at which the third mobile computing entity and the second mobile computing entity were no longer within the configurable distance from each other.

7. The apparatus of claim 5, wherein the first monitoring and the second monitoring are performed on a periodic basis, a regular basis, or a continuous basis.

8. The apparatus of claim 5, wherein the first monitoring is performed in response to one or more triggers, and wherein the first notification is displayed to the first mobile computing entity, the first notification includes a link configured to visually access the location of the second mobile computing entity upon a selection of the link.

9. A computer program product comprising at least one non-transitory computer-readable storage medium having computer-readable program code portions stored therein, the computer-readable program code portions comprising:

an executable portion configured to register a first mobile computing entity for providing notifications for events of interest related to the first mobile computing entity, wherein (a) registering the first mobile computing entity comprises automatically collecting entity information about the first mobile computing entity by establishing a connection with the first mobile computing entity using a wireless protocol, and (b) the entity information about the first mobile computing entity comprises a unique identifier assigned to the first mobile computing entity, the events of interest corresponding to a data set describing different user action types that a second user of a second mobile computing entity is selected to perform;

an executable portion configured to store a profile for a first user associated with the first mobile computing entity, the profile comprising (a) notification preferences for a first type of the events of interest and (b) the unique identifier assigned to the first mobile computing entity;

an executable portion configured to perform first monitoring, based at least in part on a particular unique identifier assigned to a third mobile computing entity, of the third mobile computing entity to track a location of the third mobile computing entity and of the second mobile computing entity to track a location of the second mobile computing entity, the third mobile computing entity being attached within a particular environment;

an executable portion configured to determine, based at least in part on the first monitoring, whether the third mobile computing entity and the second mobile computing entity are within a configurable distance from each other;

an executable portion configured to, responsive to determining that the third mobile computing entity and the second mobile computing entity are within the configurable distance from each other:

(a) determine and store a first location at which the third mobile computing entity and the second mobile computing entity were within the configurable distance from each other and an indication of a first time when the third mobile computing entity and the second mobile computing entity were within the configurable distance of each other, (b) infer, based at least on the determining the first location at which the third mobile computing entity and the second mobile computing entity were within the configurable distance from each other, that the second user of the second mobile computing entity has engaged in the first type of the events of interest (c) automatically generate a first notification to the first mobile computing entity based at least in part on, the inferring that the user of the second mobile computing entity has engaged in the first type of the events of interest an executable portion configured to determine, based at least in part on a second monitoring, whether the third mobile computing entity and the second mobile computing entity are no longer within the configurable distance from each other;

an executable portion configured to, responsive to determining that the third mobile computing entity and the second mobile computing entity are no longer within the configurable distance from each other, determine and store a second location at which the third mobile computing entity and the second mobile computing entity were no longer within the configurable distance from each other and an indication of a second time when the third mobile computing entity and the second mobile computing entity were no longer within the configurable distance from each other and automatically generate a second notification to the user based at least in part on the inferring that the second user of the second mobile computing entity has engaged in another type of the events of interest.

10. The computer program product of claim 9, wherein the second notification comprises the second time and the second location at which the third mobile computing entity and the second mobile computing entity were no longer within the configurable distance from each other.

11. The computer program product of claim 9, wherein the first monitoring and the second monitoring are performed on a periodic basis, a regular basis, or a continuous basis.

12. The computer program product of claim 9, wherein the second monitoring is performed in response to one or more triggers.

* * * * *

UNITED STATES PATENT AND TRADEMARK OFFICE
CERTIFICATE OF CORRECTION

PATENT NO. : 10,277,536 B1
APPLICATION NO. : 14/334996
DATED : April 30, 2019
INVENTOR(S) : Mark J. Davidson Page 1 of 1

It is certified that error appears in the above-identified patent and that said Letters Patent is hereby corrected as shown below:

In the Claims

Column 22, Line 25: After "entity" delete "for".

Signed and Sealed this
Second Day of July, 2019

Andrei Iancu
*Director of the United States Patent and Trademark Office*